US012450417B2

(12) United States Patent
Chiu et al.

(10) Patent No.: US 12,450,417 B2
(45) Date of Patent: Oct. 21, 2025

(54) SEMICONDUCTOR METAL LAYER STRUCTURE OVER CELL REGION

(71) Applicant: Taiwan Semiconductor Manufacturing Company, Ltd., Hsinchu (TW)

(72) Inventors: Shang-Hsuan Chiu, Hsinchu (TW); Chih-Liang Chen, Hsinchu (TW); Hui-Zhong Zhuang, Kaohsiung (TW); Chi-Yu Lu, New Taipei (TW); Jerry Chang Jui Kao, Taipei (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 774 days.

(21) Appl. No.: 17/856,412

(22) Filed: Jul. 1, 2022

(65) Prior Publication Data
US 2023/0281373 A1    Sep. 7, 2023

Related U.S. Application Data

(60) Provisional application No. 63/268,779, filed on Mar. 2, 2022.

(51) Int. Cl.
*G06F 30/392* (2020.01)
*G06F 30/396* (2020.01)
*H01L 21/027* (2006.01)
*H01L 21/68* (2006.01)
(Continued)

(52) U.S. Cl.
CPC .......... *G06F 30/392* (2020.01); *G06F 30/396* (2020.01); *G06F 2119/18* (2020.01);
(Continued)

(58) Field of Classification Search
CPC .. G06F 30/392; G06F 30/3953; G06F 30/396; G06F 2119/18; H01L 21/027;
(Continued)

(56) References Cited

U.S. PATENT DOCUMENTS 7,989,849 B2 * 8/2011 Sherlekar ............. H10D 84/907
716/126
8,368,225 B2 * 2/2013 Ikegami ................ H10D 84/00
257/E27.06
(Continued)

FOREIGN PATENT DOCUMENTS

CN       112970110 A        6/2021
DE   102018123548 A1 *   3/2019   .......... H10D 84/853
(Continued)

OTHER PUBLICATIONS

Peng et al., Chinese Patent Document No. CN-113053873-A, published Jun. 29, 2021, 4 pages including abstract and claims. (Year: 2021).*

*Primary Examiner* — Phallaka Kik
(74) *Attorney, Agent, or Firm* — Merchant & Gould P.C.

(57) ABSTRACT

Metallization structure for an integrated circuit. In one embodiment, an integrated circuit includes a metal-to-diffusion (MD) layer disposed over an active region of a cell, gates disposed over the active region of the cell, and a first metallization layer including M0 tracks disposed over the MD layer and the gates. The integrated circuit further includes a second metallization layer including M1 tracks disposed over the first metallization layer. The M1 tracks include first M1 tracks each having a first predetermined distance from an edge of the cell and second M1 tracks each having a second predetermined distance from the edge of the cell, wherein the first M1 tracks are longer than the second M1 tracks.

20 Claims, 12 Drawing Sheets

(51) Int. Cl.
  *H01L 21/71* (2006.01)
  *H01L 23/52* (2006.01)
  *H01L 25/00* (2006.01)
  *H03K 19/00* (2006.01)
  *G06F 119/18* (2020.01)

(52) U.S. Cl.
  CPC ............ *H01L 21/027* (2013.01); *H01L 21/68* (2013.01); *H01L 21/71* (2013.01); *H01L 23/52* (2013.01); *H01L 25/00* (2013.01); *H03K 19/00* (2013.01)

(58) Field of Classification Search
  CPC ......... H01L 21/68; H01L 21/71; H01L 23/52; H01L 25/00; H03K 19/00
  USPC ......... 716/55, 54, 122, 130; 703/14; 326/41, 326/47, 101; 257/499
  See application file for complete search history.

(56) References Cited

U.S. PATENT DOCUMENTS

| | | | |
|---|---|---|---|
| 10,741,540 B2 * | 8/2020 | Chen | G06F 30/392 |
| 10,784,869 B2 | 9/2020 | Peng et al. | |
| 10,878,165 B2 * | 12/2020 | Chang | G06F 30/392 |
| 11,854,974 B2 * | 12/2023 | Peng | H01L 21/76877 |
| 2020/0019670 A1 * | 1/2020 | Chang | G03F 1/70 |
| 2021/0181545 A1 * | 6/2021 | Kuo | G02F 1/2257 |
| 2021/0202466 A1 | 7/2021 | Peng et al. | |
| 2021/0343699 A1 | 11/2021 | Kim et al. | |
| 2021/0407985 A1 * | 12/2021 | Chen | G06F 30/398 |
| 2023/0162768 A1 * | 5/2023 | Lee | G11C 17/16 |
| | | | 365/244 |
| 2023/0268339 A1 * | 8/2023 | Wang | H10D 89/213 |
| | | | 257/288 |
| 2023/0301049 A1 * | 9/2023 | Fujiwara | H10B 10/12 |
| | | | 257/401 |

FOREIGN PATENT DOCUMENTS

| | | | | |
|---|---|---|---|---|
| KR | 20210134112 A | * | 11/2021 | ............. H10D 84/90 |
| TW | I707443 B | | 10/2020 | |
| TW | I709160 B | | 11/2020 | |
| TW | I724459 B | | 4/2021 | |
| TW | 202127552 A | | 7/2021 | |
| WO | WO-2020094220 A1 | * | 5/2020 | ........... H10D 84/907 |

* cited by examiner

SEMICONDUCTOR METAL LAYER STRUCTURE OVER CELL REGION

CROSS REFERENCE TO RELATED APPLICATION

This application claims the benefit of U.S. Provisional Application No. 63/268,779, filed Mar. 2, 2022, and titled "MULTIPLE MX STRUCTURE OVER STANDARD CELL REGION," the disclosure of which is hereby incorporated herein by reference.

BACKGROUND

During the layout design of an integrated circuit (IC), cells are placed in a layout and routed to form functional circuits. As ICs have come smaller, spacing and other interactions between patterns in adjacent or abutting cells place restrictions on the layout design. IC manufacturers therefore continue to seek designs and techniques for improved structure and routing for cells to ease these restrictions.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
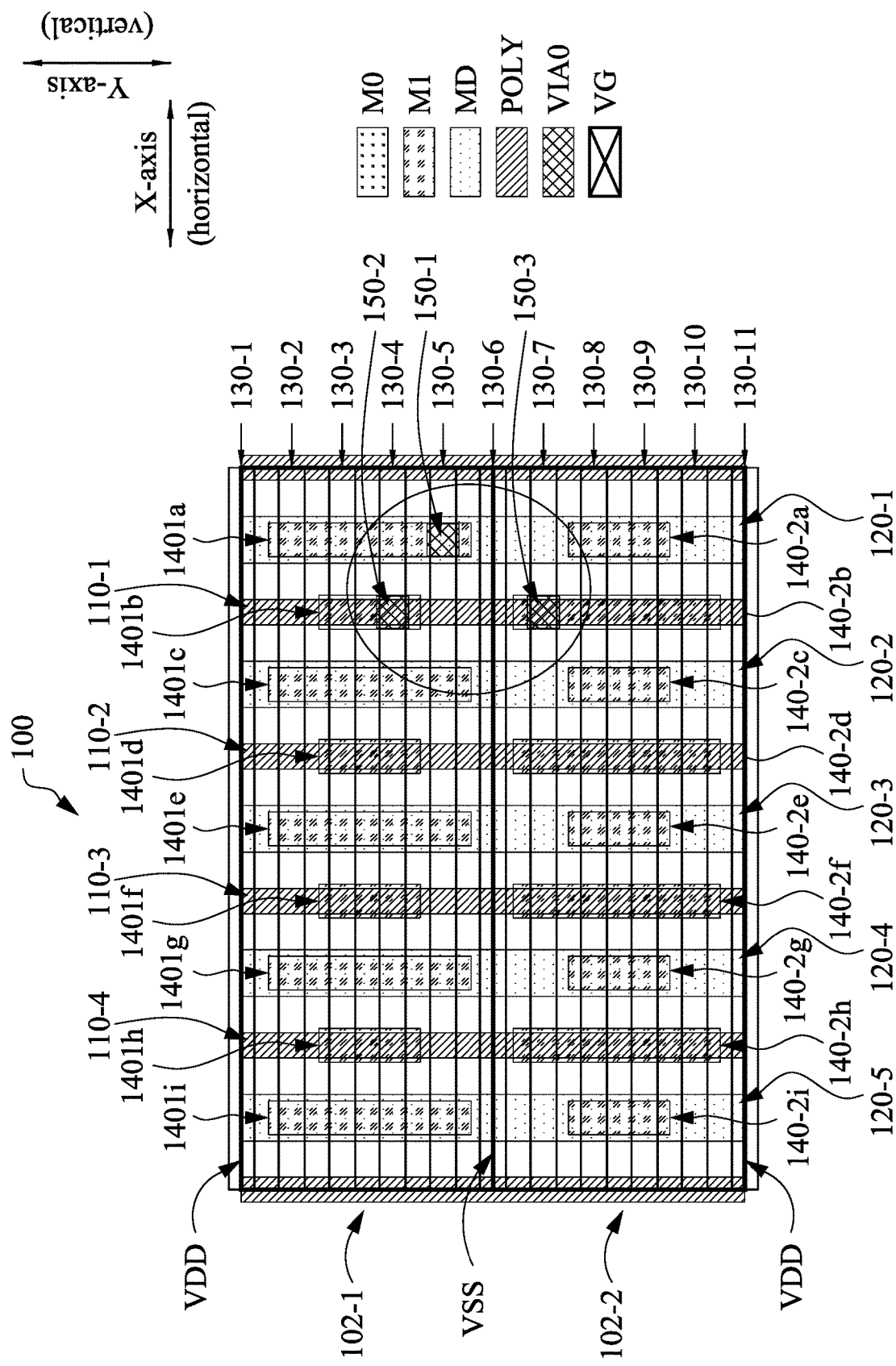
FIG. 1 is a layout structure of an integrated circuit in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a layout structure 100 of an integrated circuit in accordance with some embodiments. The layout structure 100 includes one or more cells 102 to individually or collectively form functional circuits. The term "cell" used throughout the present disclosure refers to a group of circuit patterns in a design layout to implement specific functionalities of a circuit. For example, a cell may be designed to implement an electronic circuit formed by one or more semiconductor devices (e.g., a metal-oxide-semiconductor field-effect transistor (MOSFET) device, a fin-type FET (FinFET) device, or the like). A cell is generally comprised of one or more layers, and each layer includes various patterns expressed as polygons of the same or various shapes.

In this example, the layout structure 100 includes a first cell 102-1 and a second cell 102-2 that are adjacent or abutting one another. Horizontal power/ground lines may represent the boundaries of the cells 102. For instance, a ground line VSS may define the boundary between the cells 102, and power supply lines VDD may represent a top or bottom boundary for a respective cell 102. The layout structure 100 includes multiple layers overlaid with one another along with various patterns in the respective layers from a top-view perspective. Although not shown in FIG. 1, it is understood that each cell 102 includes an active region which is an oxide-defined (OD) region in which a transistor may be formed. For example, the active region may be configured for forming channels of transistors and made of an n-type or p-type doped material.

The layout structure 100 includes gates 110 disposed across the active region of one or more cells 102. The gates 110 may extend along a vertical axis or Y-direction and be spaced from each other in the horizontal axis or X-direction. For example, FIG. 1 shows four gates 110-1 to 110-4 that may be spaced evenly along the horizontal axis. The gates 110 may sometimes be referred to as gate lines, gate structures, gate regions, or gate electrodes. In some embodiments, the gates 110 are poly silicon gates having a pattern designated as POLY and may be schematically labelled as such in the figures. Other conductive materials for conductive gates, such as metals, are within the scope of various embodiments.

The layout structure 100 also includes a metal-to-diffusion (MD) layer or tracks 120 which may also extend over the active region of one or more cells 102. The MD layer 120 may include MD tracks 120-1 to 120-5 that, like the gates 110 described above, have a longitudinal dimension or axis which extends along a vertical axis or Y-direction, and the MD tracks 120 may be spaced from each other in the horizontal axis or X-direction. The MD tracks 120 and the gates 110 may be disposed at a same level and in an alternating fashion with one another as shown in FIG. 1.

In this example, the MD layer 120 includes five MD tracks 120-1 to 120-5. The MD tracks 120-1 to 120-5 may represent source/drain structures/regions of a respective transistor. That is, the source/drain structures can conduct current through the active region of the cell 102, which is gated (e.g., modulated) by a corresponding gate 110-1 to 110-5 for conducting current through a transistor of a cell 102. Such functional structures of a transistor are collectively referred to as front-end-of-line (FEOL) structures. The gates 110 and/or MD layer 120 may be embedded in a dielectric layer, typically referred to as an inter-layer dielectric (ILD) layer, which may comprise a low-k dielectric material.

The gates 110 and MD layer 120 electrically couple to one or more metallization layers formed over the dielectric layer using one or more via over gate (VG) and via over diffusion (VD) contacts (not shown in FIG. 1), respectively. As used herein, the term via includes its use as an acronym for "vertical interconnect access." The layer formed immediately above the gates 110 and MD layer 120 may be referred to as a first metallization layer (M0) layer 130. The M0 layer 130 includes M0 tracks 130-1 to 130-11 that extend along a horizontal axis or X-direction and are spaced from each other in the vertical axis or Y-direction. The structures formed in and above the M0 layer (e.g., M1 layer, M2 layer, etc.) may be collectively referred to as back-end-of-line (BEOL) structures. Middle-of-line (MEOL) structures may therefore refer to contacts that physically and/or electrically connect a FEOL structure to a BEOL structure, such as VGs and VDs.

The layer formed above the M0 layer may be referred to as a second metallization (M1) layer 140. The M1 layer 140 includes M1 tracks 140-1*a* to 140-1*i* disposed in the first cell 102-1, and corresponding M1 tracks 140-2*a* to 140-2*i* disposed in the second cell 102-2. The M1 tracks 140-1 and 140-2 may extend over/along the gates 110 and MD track 120. Therefore, the M1 tracks 140-1 and 140-2 may extend along a vertical axis or Y-direction and be spaced from each other in the horizontal axis or X-direction. Electrical connections may be formed between the M0 layer 130 and M1 layer 140 by vias referred to as VIA0 150. In the example shown in FIG. 1, a first VIA0 150-1 couples M0 track 130-5 to M1 track 140-1*a* in the first cell 102-1, a second VIA0 150-2 couples M0 track 130-4 to M1 track 140-1*b* in the first cell 102-1, and a third VIA0 couples M0 track 130-7 to M1 track 140-2*b* in the second cell 102-2.

The layout structure 100 is enhanced in that the M1 tracks 140-1 and 140-2 are disposed in an alternating long/short fashion to improve routing and enable area reduction of the cells 102. For example, for the first cell 102-1, M1 tracks 140-1*a/c/e/g/i* comprise long tracks the extend across a substantial portion (e.g., greater than 75%) of the cell height (e.g., a distance from VSS to VDD), and they alternate with M1 tracks 140-1*b/d/f/h* which comprise shorts tracks that do not extend across a substantial portion (e.g., less than 40%) of the cell height. The second cell 102-2 includes corresponding M1 tracks 140-2 that are similarly disposed in alternating short/long configuration. However, for the second cell 102-2, long M1 tracks 140-2*b/d/f/h* correspond (e.g., align in horizontal axis) with short M1 tracks 140-1*b/d/f/h* of the first cell 102-1, and vice versa. This metallization structure improves routing and functionality within individual cells 102 and between adjacent cells 102 as described in further detail below. In particular, the circled area 170 of FIG. 1 is discussed in FIGS. 2A-B.

Figure 2B:
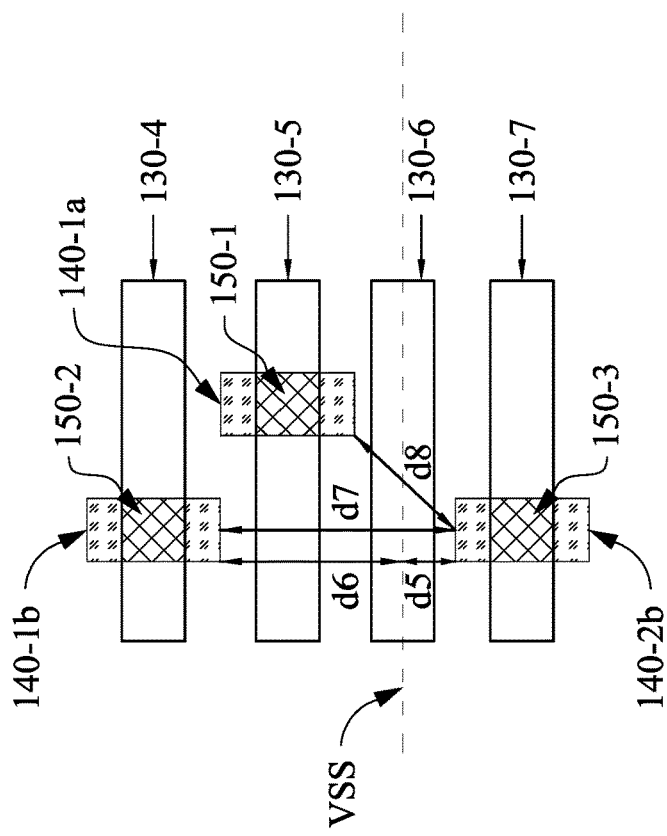
FIG. 2B is another schematic view of the circled area of FIG. 1.
Figure 2A:
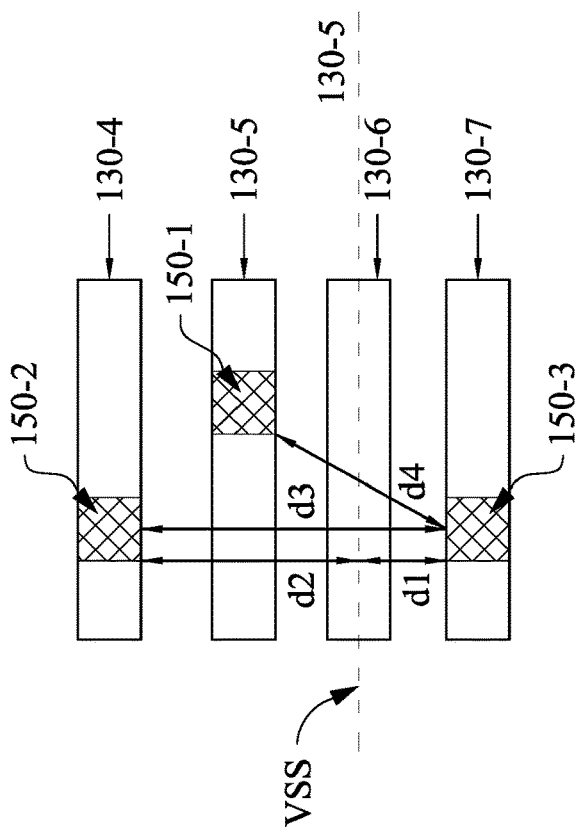
FIG. 2A is schematic view of the circled area of FIG. 1

FIG. 2A is schematic view of the circled area 170 of FIG. 1. FIG. 2B is another schematic view of the circled area 170 of FIG. 1. Referring first to FIG. 2A, VIA0s of a long track (e.g., VIA0 150-3 and/or 150-1) may be disposed a first predetermined distance d1 from the edge of the cell 102 (e.g., VSS). VIA0s of a short track (e.g., VIA0 150-2) may be disposed a second predetermined distance d2 from the edge of the cell (e.g., VSS). Accordingly, VIA0s 150 of a corresponding long/short track of adjacent cells 102 may be disposed a third predetermined distance d3 (e.g., the sum of the first distance d1 and the second distance d2) from each other. The diagonal distance d4 is also shown representing the distance between two VIA0s of the same type of track (e.g., long or short) in respective cells 102 which are abutting one another. Advantageously, the distances d1-d4 are larger than the distances which correspond thereto between vias of a conventional design, therefore enabling improved routing for a decreased cell area or height.

Referring also to FIG. 2B, a long track (e.g., M1 track 140-2*b*) may be disposed a fifth predetermined distance d5 from the edge of the cell 102 (e.g., VSS). A short track which corresponds with the long track in an adjacent cell 102 (e.g., M1 track 140-1*b*) may be disposed a sixth predetermined distance d6 from the edge of the cell (e.g., VSS). Accordingly, a corresponding long/short track of adjacent cells 102 may be disposed a seventh predetermined distance d7 (e.g., the sum of the fifth distance d5 and the sixth distance d6) from each other. The diagonal distance d8 is also shown representing the closest distance between two M1 tracks of the same type (e.g., long or short) of respective cells 102. Advantageously, the distances d5-d8 are larger than the distances which correspond thereto between M1 layer tracks of a conventional design, therefore enabling improved routing for a decreased cell area or height.

Figure 3A:
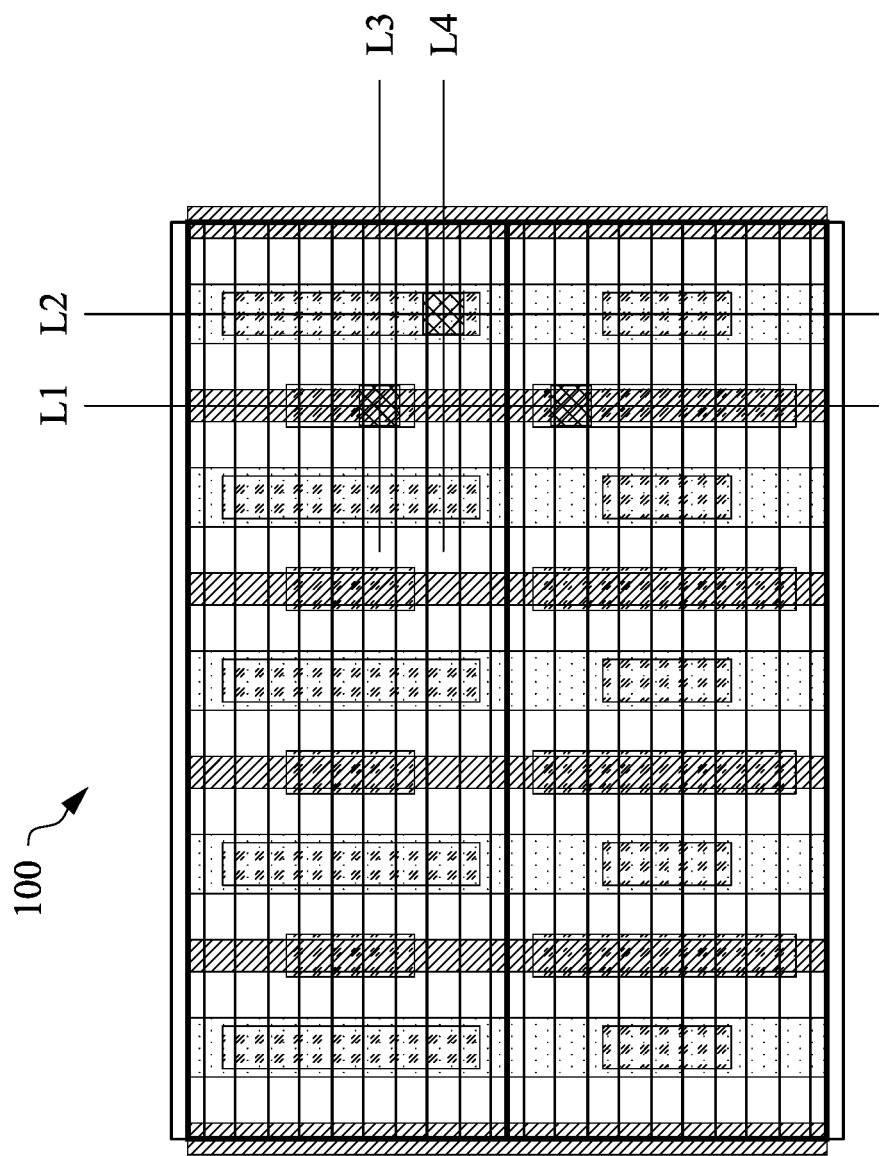
FIG. 3A shows the layout structure of FIG. 1 with cross-section lines L1-L4.
Figure 3B:
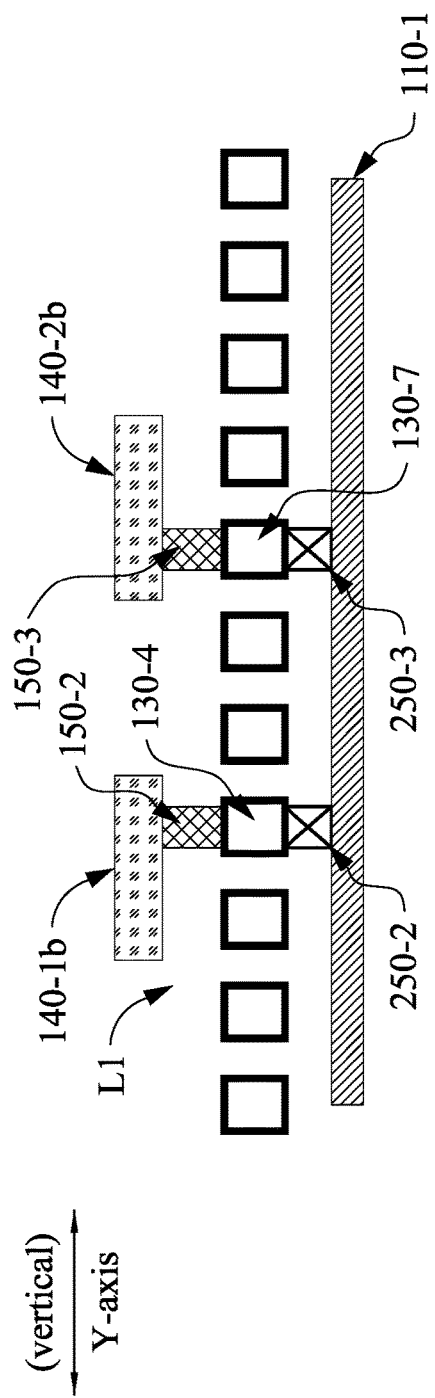
FIG. 3B is a cross-sectional view of the line L1.
Figure 3C:
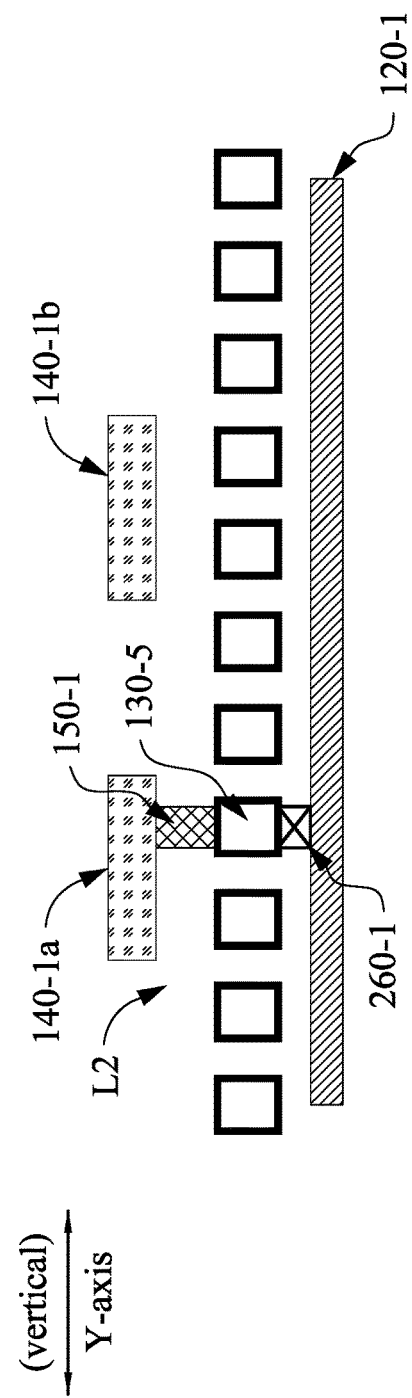
FIG. 3C is a cross-sectional view of the line L2.
Figure 3E:
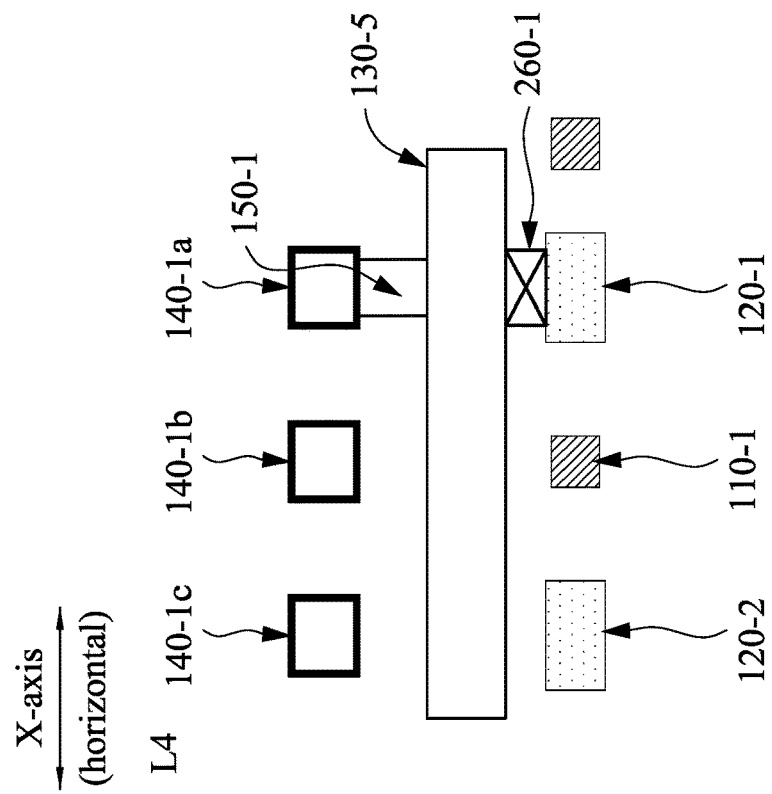
FIG. 3E is a cross-sectional view of the line L4.
Figure 3D:
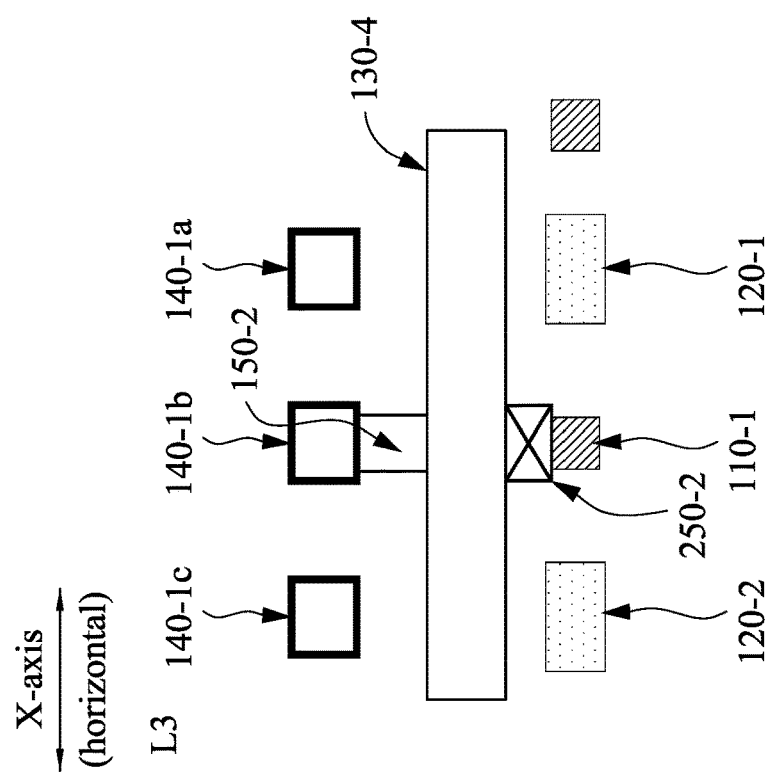
FIG. 3D is a cross-sectional view of the line L3.

FIG. 3A shows the layout structure 100 of FIG. 1 with cross-section lines L1-L4. FIG. 3B is a cross-sectional view of the line L1. FIG. 3C is a cross-sectional view of the line L2. FIG. 3D is a cross-sectional view of the line L3. FIG. 3E is a cross-sectional view of the line L4.

Referring now to FIG. 3B, cross-sectional line L1 shows corresponding M1 tracks 140-1*b* and 140-2*b* (e.g., short track of the first cell 102-1, and long track of the second cell 102-2, respectively). The M1 tracks 140-1*b* and 140-2*b* are connected to a first gate 110-1 through respective VIA0s 150-2 and 150-3, M0 tracks 130-4 and 130-7, and VGs 250-2 and 250-3. Similarly, in FIG. 3C, cross-sectional line L2 shows a neighboring column which has M1 tracks 140-1*a* (e.g., long track of the first cell 102-1) and 140-2*a* (e.g., short track of the second cell 102-2) that correspond and align along the Y-axis. The M1 track 140-1*a* is connected to a first MD track 120-1 through a VIA0 150-1, M0 track 130-5, and VD 260-1.

Referring now to FIG. 3D, cross-sectional line L3 shows neighboring M1 tracks 140-1*a* to 140-1*c* of the first cell 102-1 spaced along the X-axis. The middle M1 track 140-1*b* is disposed over the first gate 110-1, the right track 140-1*a* is disposed over a first MD track 120-1, and the left track 140-1*c* is disposed over a second MD track 120-2. Additionally, the middle M1 track 140-1*b* is connected to the first gate 110-1 by the VIA0 150-2, M0 track 130-4, and VG 250-2. Similarly, in FIG. 3E, cross-sectional line L4 shows a neighboring row (e.g., M0 track 130-5) of the first cell 102-1 including M1 tracks 140-1a to 140-1c. In this row, the right track 140-1a is connected to the first MD track 120-1 through VIA0 150-1, M0 track 130-5, and VD 260-1.

In some embodiments, the layout structure 100 includes conductive lines below the transistors. For example, in a FinFET circuit, interconnect lines may be formed below or at least partially buried under the transistor portions of the fins. These lines may be used to carry signals between devices or provide power and/or ground rails. In some examples, the buried conductive lines or conductors act as buried power rails (BPRs). In some instances, because the buried power rails are thicker and have lower resistance than the interconnector layer (which may be referred to as M0) overlying the transistors, the buried power rails may be referred to as super power rails (SPRs). In these examples and others, the buried interconnect lines provide additional routing resources, which may be used to reduce the circuit area, increase circuit density, relieve routing congestion, and/or decrease routing density in the layout structure 100.

Figure 4:
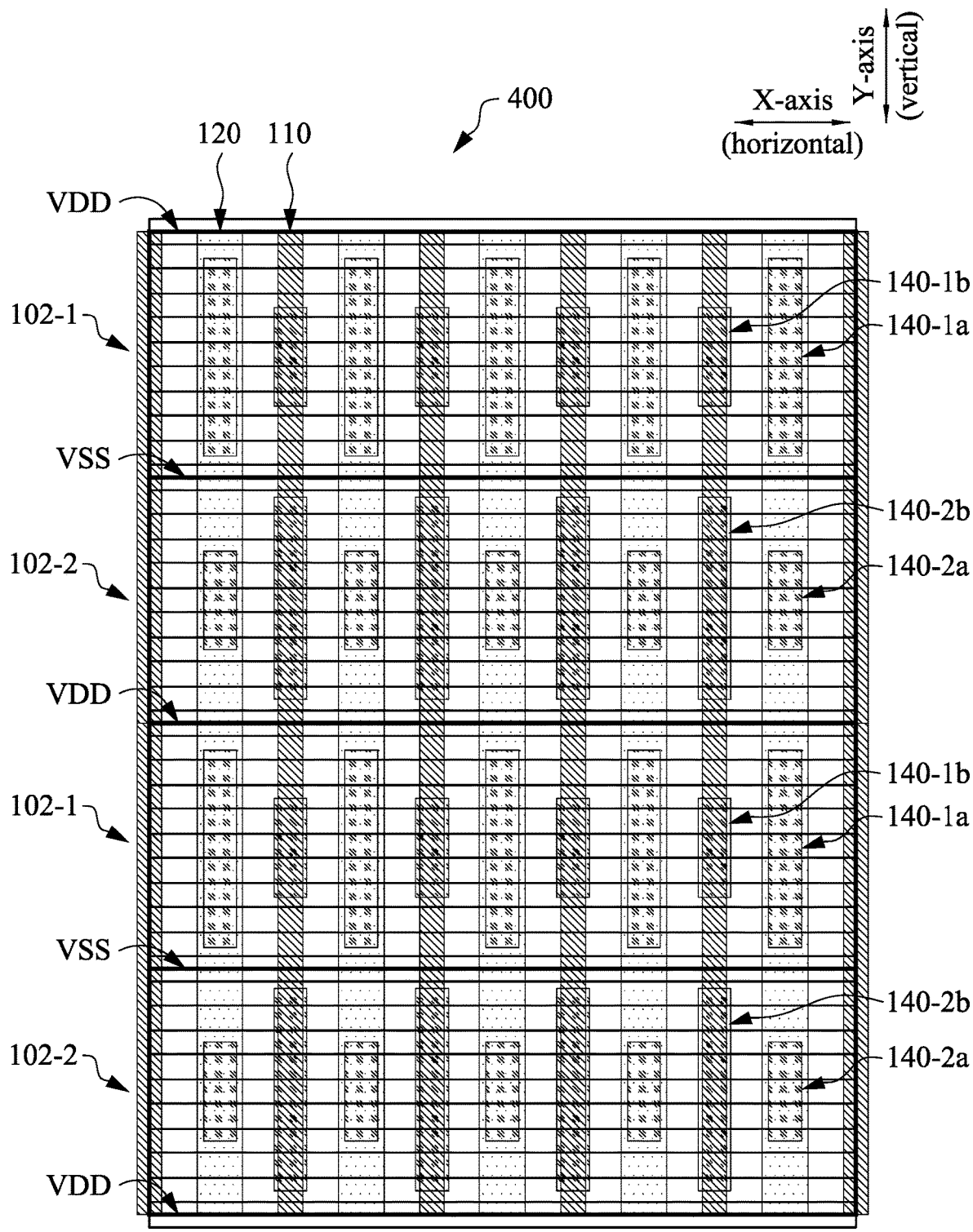
FIG. 4 is a layout structure of an integrated circuit in accordance with some embodiments.

FIG. 4 is a layout structure 400 of an integrated circuit in accordance with some embodiments. In this example, the first cell 102-1 and the second cell 102-2 alternate along the Y-axis to form a grid configuration for the layout structure 400. M1 tracks 140 are disposed in the alternating long/short pattern described above and align over the tracks of the gates 110 and MD layer 120. Additionally, the gates 110 and MD layer 120 are evenly spaced and alternate with one another along the X-axis. Accordingly, the M1 tracks 140 are provided in a 2:1 ratio to the gates 110.

In one embodiment, long M1 tracks of first cells 102-1 (e.g., M1 track 140-1a) are disposed over a respective track of the MD layer 120 for output connection of the first cell 102-1. And, short M1 tracks of first cells 102-1 (e.g., M1 track 140-1b) are disposed over a respective gate 110 for input connection of the first cell 102-1. Additionally, long M1 tracks of second cells 102-2 (e.g., M1 track 140-2b) are disposed over a respective gate 110 for output connection of the second cell 102-2. And, short M1 tracks of second cells 102-2 (e.g., M1 track 140-1b) are disposed over a respective track of the MD layer 120 for input connection of the second cell 102-2.

Figure 5:
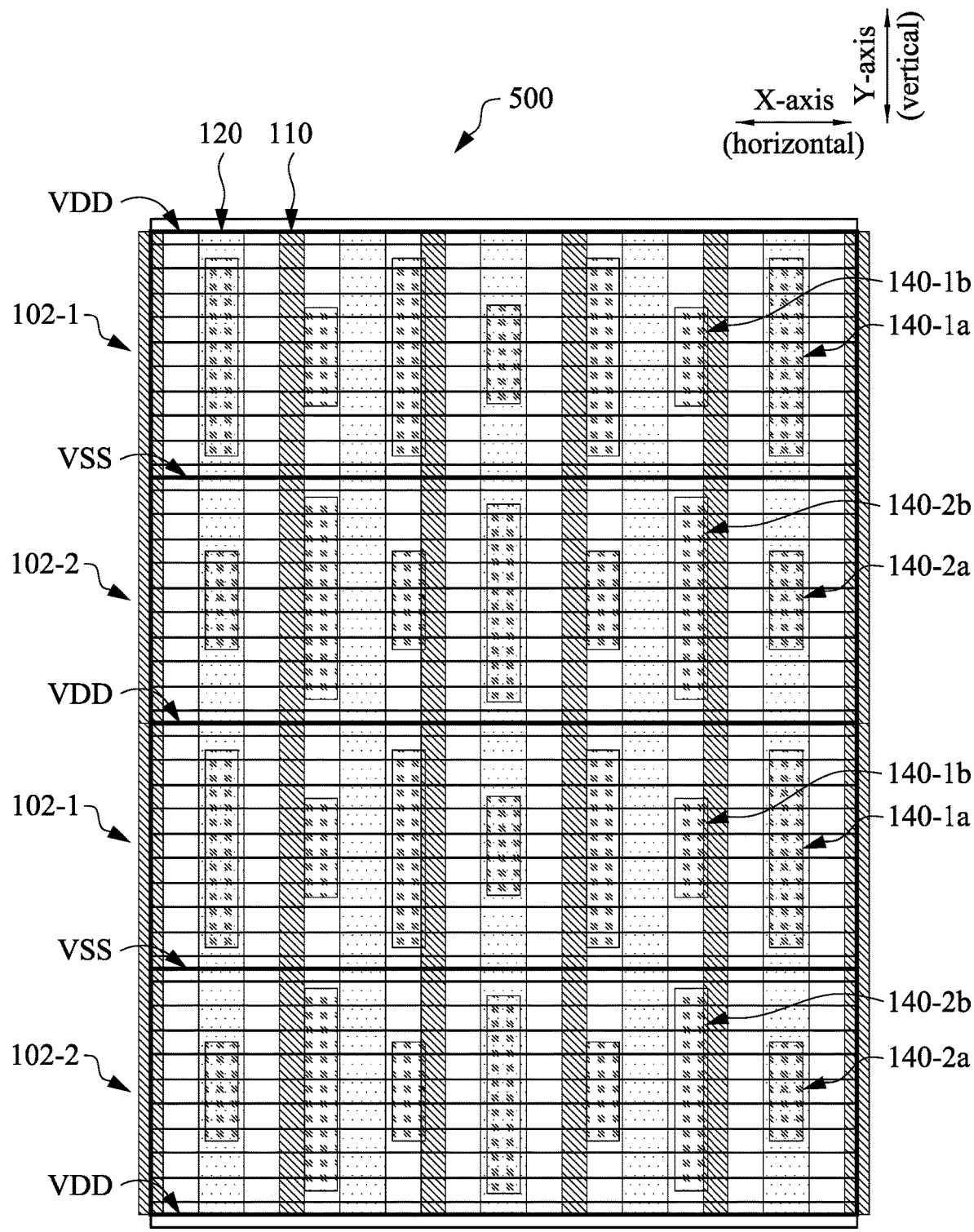
FIG. 5 is another example layout structure of an integrated circuit in accordance with some embodiments.
Figure 6:
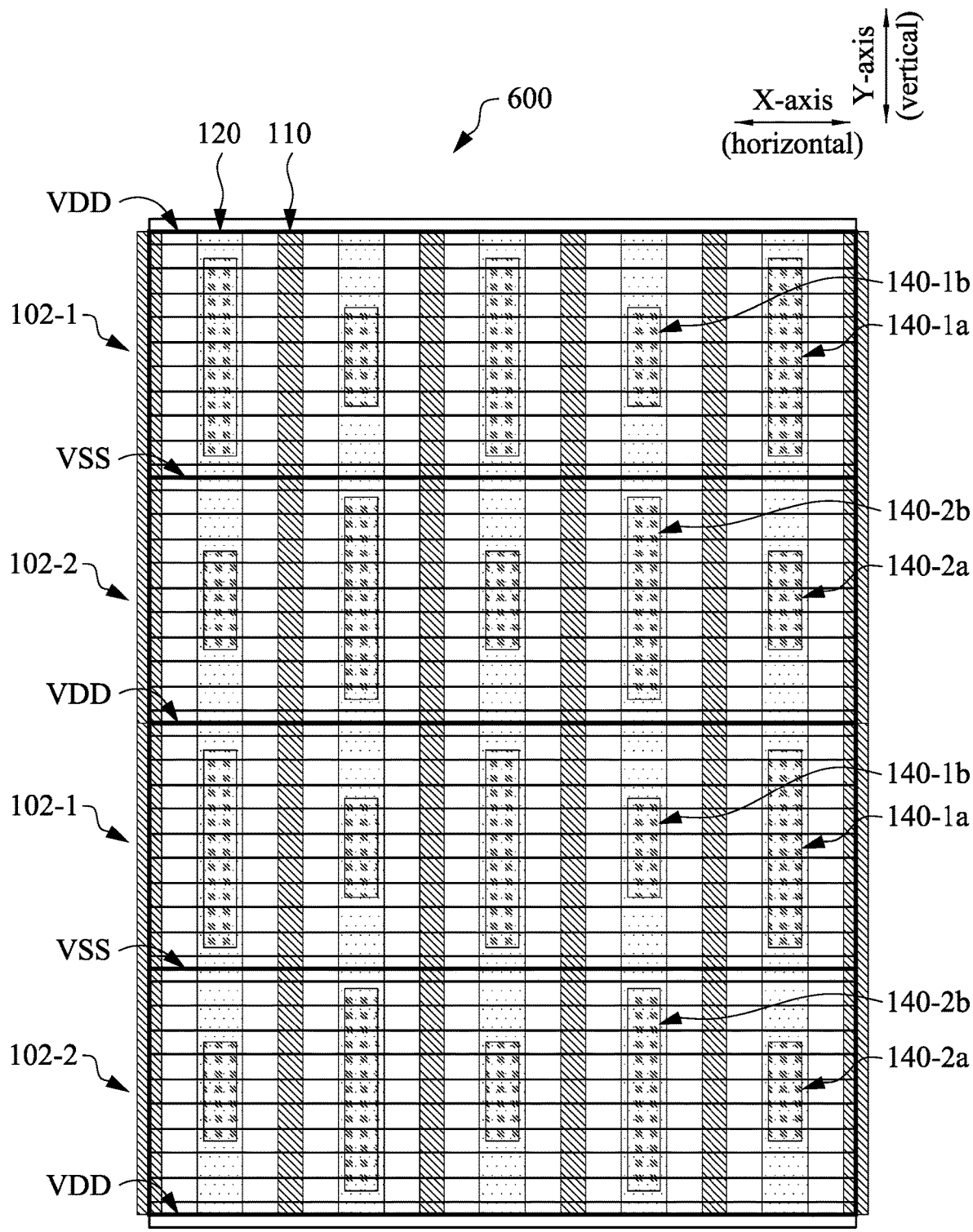
FIG. 6 is yet another example layout structure of an integrated circuit in accordance with some embodiments.

FIG. 5 is another example layout structure 500 of an integrated circuit in accordance with some embodiments. In this example, M1 tracks 140 are offset along the X-axis with respect to the gates 110 and MD layer 120. Additionally, the M1 tracks 140 are provided in a 3:2 ratio to the gates 110. FIG. 6 is yet another example layout structure 600 of an integrated circuit in accordance with some embodiments. In this example, M1 tracks 140 are disposed over tracks of the MD layer 120 but are not disposed over (e.g. skip) the gates 110. Accordingly, the M1 tracks 140 are provided in a 1:1 ratio to the gates 110.

Figure 7:
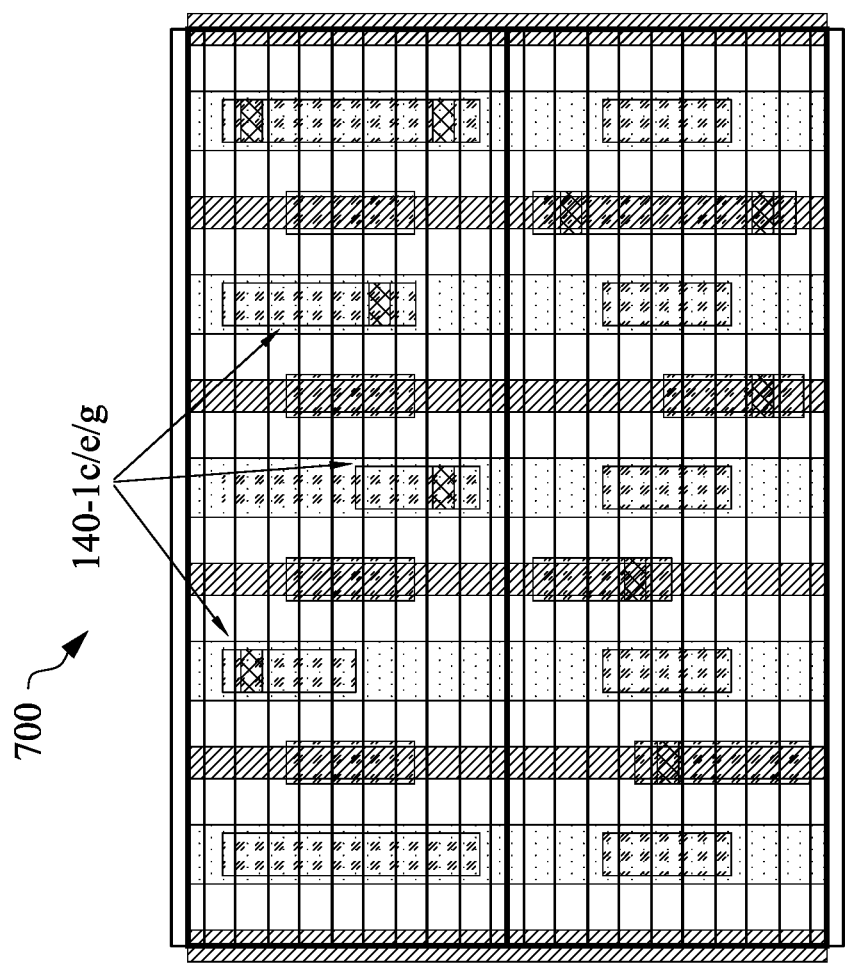
FIG. 7 is another example layout structure of an integrated circuit in accordance with some embodiments.

FIG. 7 is another example layout structure 700 of an integrated circuit in accordance with some embodiments. As shown by this example, one or more M1 tracks which would be long according to the long/short pattern descried above (e.g., M1 tracks 140-1c/e/g) may be shortened for routing flexibility from a neighboring structure to improve performance.

Figure 8:
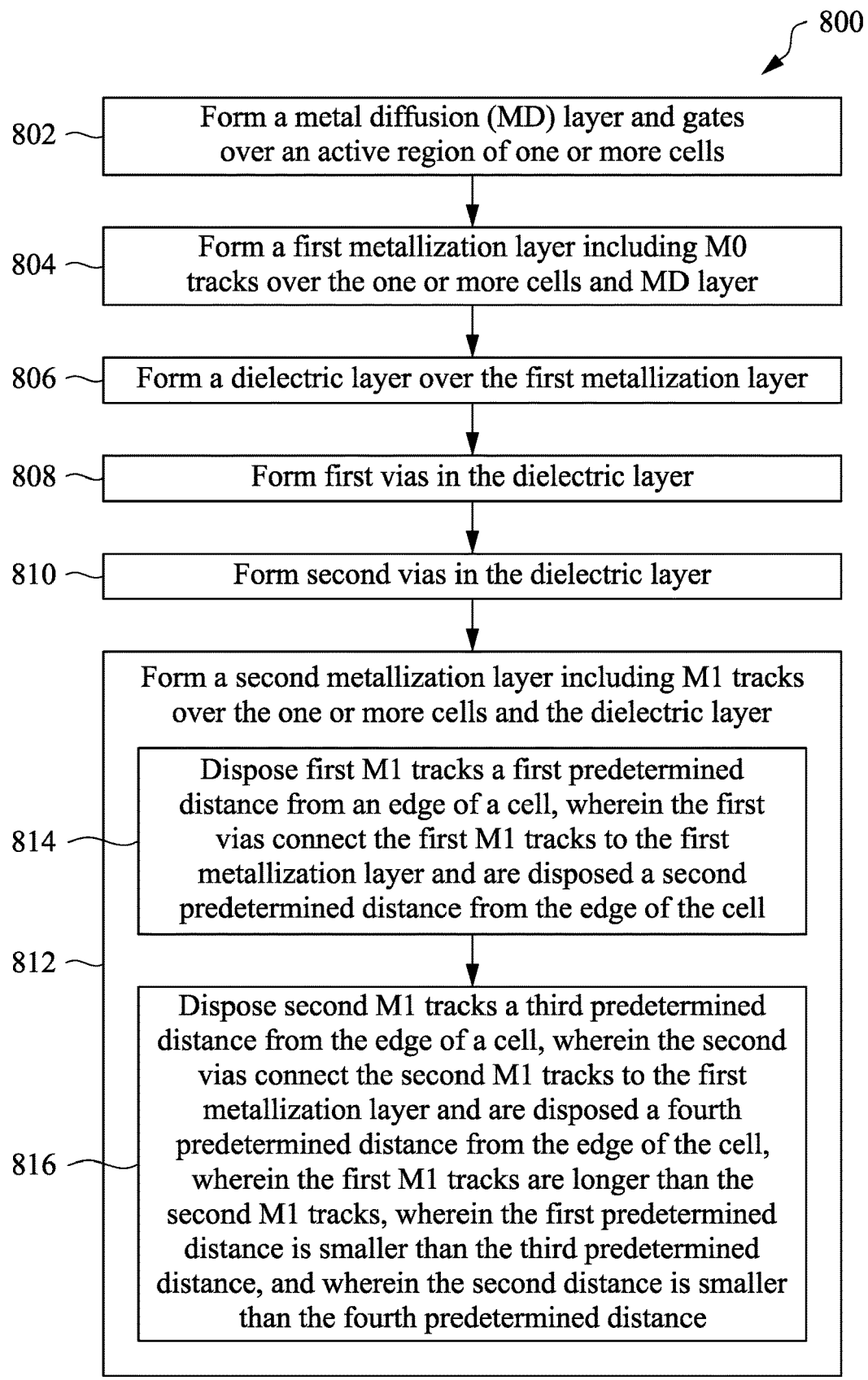
FIG. 8 illustrates an example method of forming a cell layout structure in accordance with some embodiments.

FIG. 8 illustrates an example method 800 of forming a cell layout structure in accordance with some embodiments. Although the method is illustrated and/or described as a series of acts or events, it will be appreciated that the method is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At step 802, an MD layer 120 and gates 110 are formed over an active region of one or more cells. At step 804, a first metallization layer 130 including M0 tracks are disposed over the one or more cells and MD layer. At step 806, a dielectric layer is formed over the first metallization layer 130. At step 808, first vias are formed in the dielectric layer. At step 810, second vias are formed in the dielectric layer. At step 812, a second metallization layer 140 including M1 tracks are formed over the one or more cells and the dielectric layer. Step 812 may include one or more of steps 814-816.

At step 814, first M1 tracks are disposed a first predetermined distance from an edge of the cell. The first vias (e.g., formed in step 808) connect the first M1 tracks to the first metallization layer 130 and may each be disposed a second predetermined distance from the edge of the cell. That is, the first vias may correspond with long M1 tracks and each have a similar distance to the common boundary between cells. For this example flowchart, the first predetermined distance may correspond with the distance d5 shown and described with respect to FIG. 2B, and the second predetermined distance may correspond with the distance d1 shown and described with respect to FIG. 2A.

At step 816, second M1 tracks are disposed a third predetermined distance from an edge of the cell. The second vias (e.g., formed in step 810) connect the second M1 tracks to the first metallization layer 130 and may each be disposed a fourth predetermined distance from the edge of the cell. The second vias may correspond with short M1 tracks and each have a similar distance to the common boundary between cells. Again, for this example flowchart, the third predetermined distance may correspond with the distance d6 shown and described with respect to FIG. 2B, and the fourth predetermined distance may correspond with the distance d2 shown and described with respect to FIG. 2A. Accordingly, the first M1 tracks are longer than the second M1 tracks, the first predetermined distance (e.g., d5) is smaller than the third predetermined distance (e.g., d6), and the second predetermined distance (e.g., d1) is smaller than the fourth predetermine distance (e.g., d2). It will be appreciated that alternative naming conventions or orders for the predetermined distances may apply.

Figure 9:
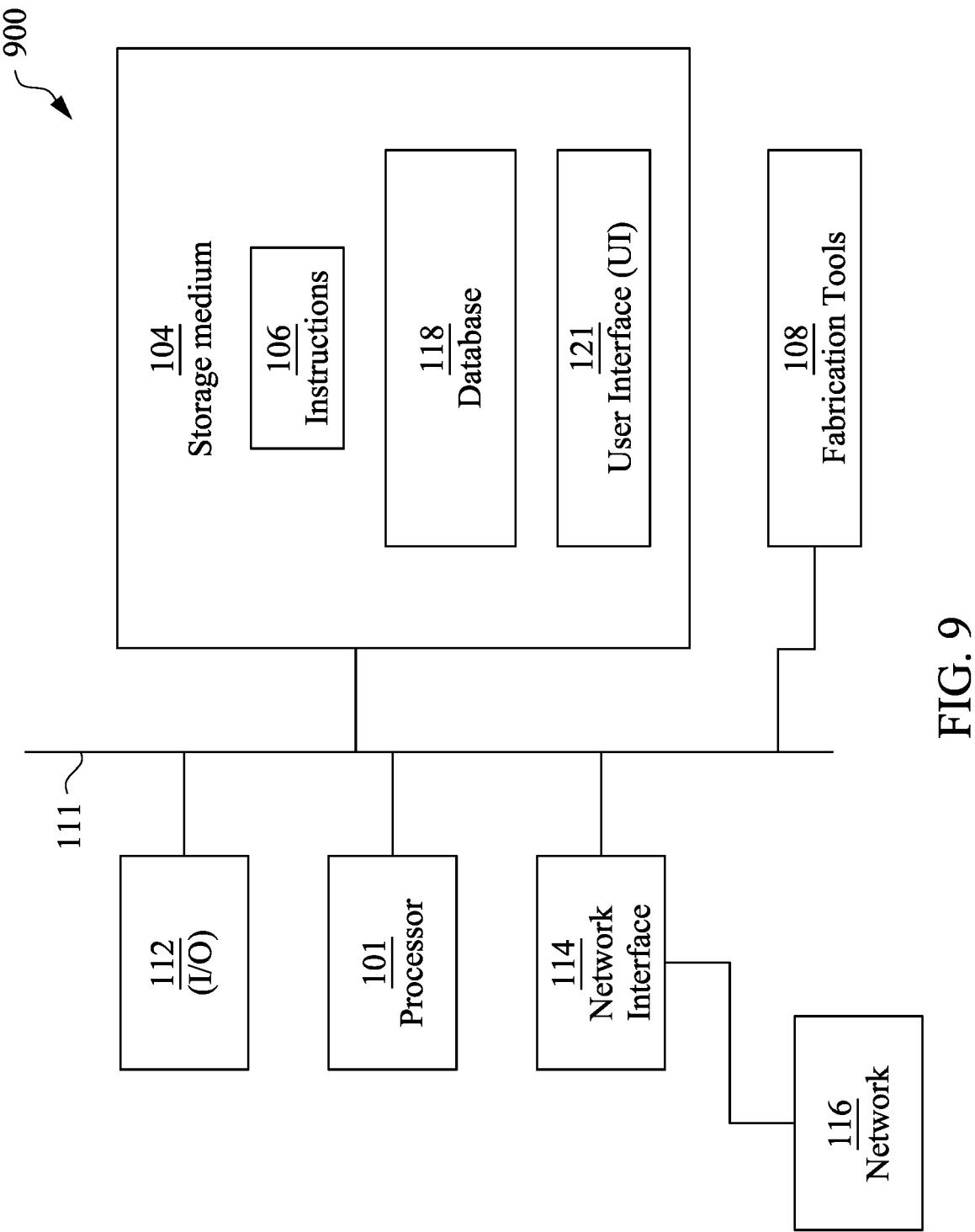
FIG. 9 is a block diagram schematically illustrating an example of a computer system configured to provide a semiconductor device, such as the layout structure device of FIG. 1, in accordance with some embodiments.

FIG. 9 is a block diagram schematically illustrating an example of a computer system 900 configured to provide a semiconductor device, such as the layout structure device 100 of FIG. 1, in accordance with some embodiments. Some or all the design, layout, and manufacture of ICs including the layout structure 100 (shown in FIG. 1), and functional blocks, can be performed by or with the computer system 900. In some embodiments, the computer system 900 includes an engineering design automation (EDA) system.

In some embodiments, the system 900 is a general-purpose computing device including a processor 101 and a non-transitory, computer-readable storage medium 104. The computer-readable storage medium 104 may be encoded with, e.g., store, computer program code such as executable instructions 106. Execution of the instructions 106 by the processor 101 provides (at least in part) a tool that implements a portion or all the functions of the system 900, such as pre-layout simulations, post-layout simulations, component placement, DRC, routing of the IC, rerouting of the IC, and a final layout for manufacture. Further, fabrication tools 108 are included to further layout and physically implement the design, layout, and manufacture of the ICs. In some embodiments, the system 900 includes a commercial router. In some embodiments, the system 900 includes an automated place and route (APR) system. In some embodiments, the computer system 900 includes at least one PnR tool and, in some embodiments, the computer system 900 includes at least one FP checker that checks for design rule compliance.

The processor 101 is electrically coupled to the computer-readable storage medium 104 by a bus 111 and to an I/O interface 112 by the bus 111. A network interface 114 is also electrically connected to the processor 101 by the bus 111. The network interface 114 is connected to a network 116, so that the processor 101 and the computer-readable storage medium 104 can connect to external elements using the network 116. The processor 101 is configured to execute the computer program code or instructions 106 encoded in the computer-readable storage medium 104 to cause the system 900 to perform a portion or all the functions of the system 900. In some embodiments, the processor 101 is a central processing unit (CPU), a multi-processor, a distributed processing system, an application specific integrated circuit (ASIC), and/or a suitable processing unit.

In some embodiments, the computer-readable storage medium 104 is an electronic, magnetic, optical, electromagnetic, infrared, and/or semiconductor system or apparatus or device. For example, the computer-readable storage medium 104 can include a semiconductor or solid-state memory, a magnetic tape, a removable computer diskette, a random-access memory (RAM), a read-only memory (ROM), a rigid magnetic disk, and/or an optical disk. In some embodiments using optical disks, the computer-readable storage medium 104 can include a compact disk, read only memory (CD-ROM), a compact disk read/write memory (CD-R/W), and/or a digital video disc (DVD).

In some embodiments, the computer-readable storage medium 104 stores computer program code or instructions 106 configured to cause the system 900 to perform a portion or all the functions of the system 900. In some embodiments, the computer-readable storage medium 104 stores information which facilitates performing a portion or all the functions of the system 900. In some embodiments, the computer-readable storage medium 104 stores a database 118 that includes one or more of component libraries, digital circuit cell libraries, and databases. In some embodiments, the database 118 includes one or more of dummy cell libraries, STD logic cell libraries, and macro function libraries.

The system 900 includes the I/O interface 112, which is coupled to external circuitry. In some embodiments, the I/O interface 112 includes a keyboard, keypad, mouse, trackball, trackpad, touchscreen, and/or cursor direction keys for communicating information and commands to the processor 101.

The network interface 114 is coupled to the processor 101 and allows the system 900 to communicate with the network 116, to which one or more other computer systems are connected. The network interface 114 can include: wireless network interfaces such as BLUETOOTH, WIFI, WIMAX, GPRS, or WCDMA; or wired network interfaces such as ETHERNET, USB, or IEEE-1364. In some embodiments, a portion or all the functions of the system 900 can be performed in two or more systems that are like system 900.

The system 900 is configured to receive information through the I/O interface 112. The information received through the I/O interface 112 includes one or more of instructions, data, design rules, libraries of components and cells, and/or other parameters for processing by processor 101. The information is transferred to the processor 101 by the bus 111. Also, the system 900 is configured to receive information related to a user interface (UI) through the I/O interface 112. This UI information can be stored in the computer-readable storage medium 104 as a UI 121.

In some embodiments, a portion or all the functions of the system 900 are implemented via a standalone software application for execution by a processor. In some embodiments, a portion or all the functions of the system 900 are implemented in a software application that is a part of an additional software application. In some embodiments, a portion or all the functions of the system 900 are implemented as a plug-in to a software application. In some embodiments, at least one of the functions of the system 900 is implemented as a software application that is a portion of an EDA tool. In some embodiments, a portion or all the functions of the system 900 are implemented as a software application that is used by the system 900. In some embodiments, a layout diagram is generated using a tool such as VIRTUOSO available from CADENCE DESIGN SYSTEMS, Inc., or another suitable layout generating tool.

In some embodiments, the IC device layouts and other processes are realized as functions of a program stored in a non-transitory computer readable recording medium. Examples of a non-transitory computer readable recording medium include, but are not limited to, external/removable and/or internal/built-in storage or memory units, e.g., one or more optical disks such as a DVD, a magnetic disk such as a hard disk, a semiconductor memory such as a ROM and RAM, and a memory card, and the like.

As noted above, embodiments of the system 900 include fabrication tools 108 for implementing the manufacturing processes of the system 900. For example, based on the final layout, photolithographic masks may be generated, which are used to fabricate the IC by the fabrication tools 108.

Figure 10:
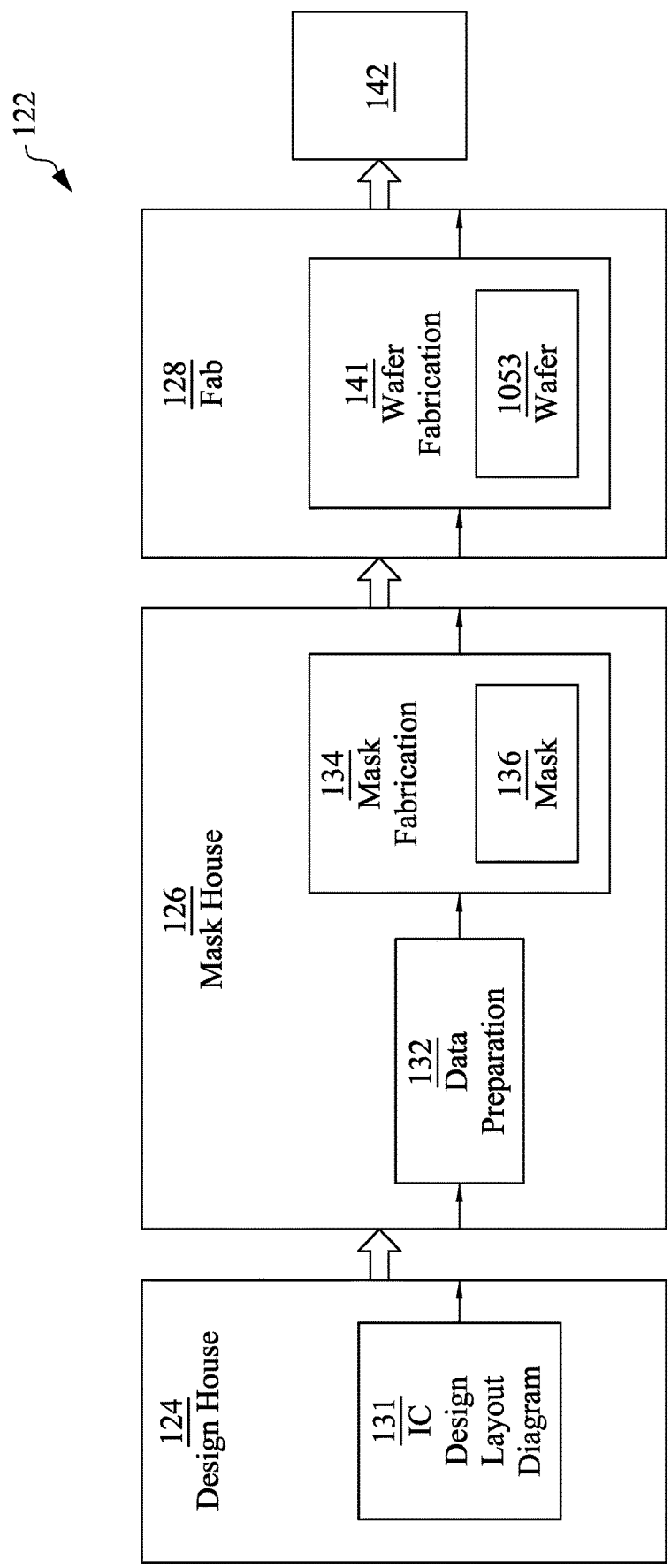
FIG. 10 is a block diagram of an IC manufacturing system and an IC manufacturing flow associated therewith, in accordance with some embodiments.

Further aspects of device fabrication are disclosed in conjunction with FIG. 10, which is a block diagram of an IC manufacturing system 122 and an IC manufacturing flow associated therewith, in accordance with some embodiments. In some embodiments, based on a layout diagram, one or more semiconductor masks and/or at least one component in a layer of a semiconductor IC is fabricated using the manufacturing system 122.

In FIG. 10, the IC manufacturing system 122 includes entities, such as a design house 124, a mask house 126, and an IC manufacturer/fabricator ("fab") 128, that interact with one another in the design, development, and manufacturing cycles and/or services related to manufacturing an IC, such as the ICs described herein. The entities in the system 122 are connected by a communications network. In some embodiments, the communications network is a single network. In some embodiments, the communications network is a variety of different networks, such as an intranet and the internet. The communications network includes wired and/or wireless communication channels. Each entity interacts with one or more of the other entities and provides services to and/or receives services from one or more of the other entities. In some embodiments, two or more of the design house 124, the mask house 126, and the IC fab 128 are owned by a single larger company. In some embodiments, two or more of the design house 124, the mask house 126, and the IC fab 128 coexist in a common facility and use common resources.

The design house (or design team) 124 generates an IC design layout diagram 131. The IC design layout diagram 131 includes various geometrical patterns, or IC layout diagrams designed for an IC device. The geometrical patterns correspond to patterns of metal, oxide, and/or semiconductor layers that make up the various components of the semiconductor structures to be fabricated. The various layers combine to form various IC features. For example, a portion of the IC design layout diagram 131 includes various IC features, such as diagonal vias, active areas or regions, gate electrodes, sources, drains, metal lines, local vias, and openings for bond pads, to be formed in a semiconductor substrate (such as a silicon wafer) and in various material layers disposed on the semiconductor substrate.

The design house 124 implements a design procedure to form an IC design layout diagram 131. The IC design layout diagram 131 is presented in one or more data files having information of the geometrical patterns. For example, IC design layout diagram 131 can be expressed in a GDSII file format or DFII file format. In some embodiments, the design procedure includes one or more of analog circuit design, digital logic circuit design, dummy cell design, functional block design, macro design, place and route routines, DRC, and physical layout design. In some embodiments, the design house 124 includes at least one PnR tool for component and/or functional block placement and routing. In some embodiments, the design house 124 includes at least one FP checker for checking compliance with design rules.

The mask house 126 includes data preparation 132 and mask fabrication 134. The mask house 126 uses the IC design layout diagram 131 to manufacture one or more masks 136 to be used for fabricating the various layers of the IC or semiconductor structure. The mask house 126 performs mask data preparation 132, where the IC design layout diagram 131 is translated into a representative data file (RDF). The mask data preparation 132 provides the RDF to the mask fabrication 134. The mask fabrication 134 includes a mask writer that converts the RDF to an image on a substrate, such as a mask (reticle) 136 or a semiconductor wafer 138. The design layout diagram 131 is manipulated by the mask data preparation 132 to comply with characteristics of the mask writer and/or criteria of the IC fab 128. In FIG. 10, the mask data preparation 132 and the mask fabrication 134 are illustrated as separate elements. In some embodiments, the mask data preparation 132 and the mask fabrication 134 can be collectively referred to as mask data preparation.

In some embodiments, the mask data preparation 132 includes an optical proximity correction (OPC) which uses lithography enhancement techniques to compensate for image errors, such as those that can arise from diffraction, interference, other process effects and the like. The OPC adjusts the IC design layout diagram 131. In some embodiments, the mask data preparation 132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, the mask data preparation 132 includes a mask rule checker (MRC) that checks the IC design layout diagram 131 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 131 to compensate for limitations during the mask fabrication 134, which may undo part of the modifications performed by OPC to meet mask creation rules.

In some embodiments, the mask data preparation 132 includes lithography process checking (LPC) that simulates processing that will be implemented by the IC fab 128. LPC simulates this processing based on the IC design layout diagram 131 to create a simulated manufactured device. The processing parameters in LPC simulation can include parameters associated with various processes of the IC manufacturing cycle, parameters associated with tools used for manufacturing the IC, and/or other aspects of the manufacturing process. LPC considers various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine the IC design layout diagram 131.

The above description of mask data preparation 132 has been simplified for the purposes of clarity. In some embodiments, data preparation 132 includes additional features such as a logic operation (LOP) to modify the IC design layout diagram 131 according to manufacturing rules. Additionally, the processes applied to the IC design layout diagram 131 during data preparation 132 may be executed in a variety of different orders.

After the mask data preparation 132 and during the mask fabrication 134, a mask 136 or a group of masks 136 are fabricated based on the modified IC design layout diagram 131. In some embodiments, the mask fabrication 134 includes performing one or more lithographic exposures based on the IC design layout diagram 131. In some embodiments, an electron-beam (e-beam) or a mechanism of multiple e-beams is used to form a pattern on a mask (photomask or reticle) 136 based on the modified IC design layout diagram 131. The mask 136 can be formed in various technologies. In some embodiments, the mask 136 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region, and transmits through the transparent regions. In one example, a binary mask version of the mask 136 includes a transparent substrate (e.g., fused quartz) and an opaque material (e.g., chromium) coated in the opaque regions of the binary mask. In another example, the mask 136 is formed using a phase shift technology. In a phase shift mask (PSM) version of the mask 136, various features in the pattern formed on the phase shift mask are configured to have proper phase difference to enhance the resolution and imaging quality. In various examples, the phase shift mask can be attenuated PSM or alternating PSM. The mask(s) generated by the mask fabrication 134 is used in a variety of processes. For example, such a mask(s) is used in an ion implantation process to form various doped regions in the semiconductor wafer 138, in an etching process to form various etching regions in the semiconductor wafer 138, and/or in other suitable processes.

The IC fab 128 includes wafer fabrication 141. The IC fab 128 is an IC fabrication business that includes one or more manufacturing facilities for the fabrication of a variety of different IC products. In some embodiments, the IC fab 128 is a semiconductor foundry. For example, there may be a manufacturing facility for the front end of line (FEOL) fabrication of a plurality of IC products, while a second manufacturing facility may provide the back end of line (BEOL) fabrication for the interconnection and packaging of the IC products, and a third manufacturing facility may provide other services for the foundry business.

The IC fab 128 uses the mask(s) 136 fabricated by the mask house 126 to fabricate the semiconductor structures or ICs 142 of the current disclosure. Thus, the IC fab 128 at least indirectly uses the IC design layout diagram 131 to fabricate the semiconductor structures or ICs 142 of the current disclosure. Also, the semiconductor wafer 138 includes a silicon substrate or other proper substrate having material layers formed thereon, and the semiconductor wafer 138 further includes one or more of various doped regions, dielectric features, multilevel interconnects, and the like (formed at subsequent manufacturing steps). In some embodiments, the semiconductor wafer 138 is fabricated by the IC fab 128 using the mask(s) 136 to form the semiconductor structures or ICs 142 of the current disclosure. In some embodiments, the IC fabrication includes performing one or more lithographic exposures based at least indirectly on the IC design layout diagram 131.

Accordingly, the various embodiments disclosed herein provide an integrated circuit with improved metallization location for routing connections. In one embodiment, the integrated circuit includes a metal-to-diffusion (MD) layer disposed over an active region of a cell, gates disposed over the active region of the cell, and a first metallization layer including M0 tracks disposed over the MD layer and the gates. The integrated circuit further includes a second metallization layer including M1 tracks disposed over the first metallization layer. The M1 tracks include first M1 tracks each having a first predetermined distance from an edge of the cell and second M1 tracks each having a second predetermined distance from the edge of the cell, wherein the first M1 tracks are longer than the second M1 tracks.

In a further embodiment, an integrated circuit includes a first cell, a second cell abutting the first cell, a metal-to-diffusion (MD) layer extending over the first cell and the second cell, gates extending over the first cell and the second cell, and a first metallization layer including M0 tracks disposed over the MD layer and the gates. The integrated circuit also includes a second metallization layer including M1 tracks disposed over the first metallization layer, the M1 tracks including first M1 tracks and second M1 tracks, wherein the first M1 tracks are longer than the second M1 tracks, wherein the first M1 tracks of the first cell align with the second M1 tracks of the second cell, and wherein the second M1 tracks of the first cell align with the first M1 tracks of the second cell.

In accordance with further disclosed embodiments, a method of forming an integrated circuit or a cell layout structure is provided. The method includes forming a metal diffusion (MD) layer and gates over an active region of one or more cells, forming a first metallization layer including M0 tracks over the one or more cells, and forming a second metallization layer including M1 tracks over the first metallization layer, wherein first M1 tracks are disposed a first predetermined distance from an edge of a cell, second M1 tracks are disposed a second predetermined distance from the edge of the cell, wherein the first M1 tracks are longer than the second M1 tracks, and wherein the first predetermined distance is smaller than the second predetermined distance.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit, comprising:
a metal-to-diffusion (MD) layer disposed over an active region of a cell;
gates disposed over the active region of the cell;
a first metallization layer including MD tracks disposed over the MD layer and the gates; and
a second metallization layer including M1 tracks disposed over the first metallization layer, wherein the M1 tracks include first M1 tracks each having a first predetermined distance from an edge of the cell and second M1 tracks each having a second predetermined distance from the edge of the cell, and wherein the first M1 tracks are longer than the second M1 tracks.

2. The integrated circuit of claim 1, wherein the MD layer includes MD tracks arranged to extend along a first direction and spaced from each other in a second direction perpendicular to the first direction.

3. The integrated circuit of claim 2, wherein the gates are arranged to extend along the first direction and spaced from each other in the second direction to alternate in the second direction with the MD tracks.

4. The integrated circuit of claim 3, wherein the M0 tracks are arranged to extend along the second direction and spaced from each other in the first direction.

5. The integrated circuit of claim 4, wherein the M1 tracks are arranged to extend along the first direction and spaced from each other in the second direction.

6. The integrated circuit of claim 5, wherein the first M1 tracks and the second M1 tracks alternate with each other in the second direction.

7. The integrated circuit of claim 1, wherein the first predetermined distance between each of the first M1 tracks and the edge of the cell is smaller than the second predetermined distance between each of the second M1 tracks and the edge of the cell.

8. The integrated circuit of claim 7, further comprising:
first vias to connect one or more the first M1 tracks to the first metallization layer; and
second vias to connect one or more of the second M1 tracks to the first metallization layer,
wherein the first vias are disposed a third predetermined distance from the edge of the cell, the second vias are disposed a fourth predetermined distance from the edge of the cell, and the third predetermined distance is smaller than the fourth predetermined distance.

9. An integrated circuit, comprising:
a first cell,
a second cell abutting the first cell;
a metal-to-diffusion (MD) layer extending over the first cell and the second cell;
gates extending over the first cell and the second cell;
a first metallization layer including MD tracks disposed over the MD layer and the gates; and
a second metallization layer including M1 tracks disposed over the first metallization layer, the M1 tracks including first M1 tracks and second M1 tracks, wherein the first M1 tracks are longer than the second M1 tracks, wherein the first M1 tracks of the first cell align with the second M1 tracks of the second cell, and wherein the second M1 tracks of the first cell align with the first M1 tracks of the second cell.

10. The integrated circuit of claim 9, wherein the first M1 tracks each have a first predetermined distance from a boundary between the first cell and the second cell, and wherein second M1 tracks each have a second predetermined distance from the boundary.

11. The integrated circuit of claim 10, wherein the first predetermined distance is smaller than the second predetermined distance.

12. The integrated circuit of claim 9, wherein:
the MD layer includes MD tracks arranged to extend along a first direction and spaced from each other in a second direction perpendicular to the first direction;
the gates are arranged to extend along the first direction and spaced from each other in the second direction to alternate in the second direction with the MD tracks;
the M0 tracks are arranged to extend along the second direction and spaced from each other in the first direction, and
wherein the M1 tracks are arranged to extend along the first direction and spaced from each other in the second direction.

13. The integrated circuit of claim 12, wherein the first M1 tracks and the second M1 tracks alternate with each other in the second direction.

14. The integrated circuit of claim 13, wherein the first M1 tracks align over tracks of the MD layer, and wherein the second M1 tracks align over the gates.

15. A method of forming a cell layout structure, the method comprising:
forming a metal diffusion (MD) layer and gates over an active region of one or more cells;
forming a first metallization layer including MD tracks over the one or more cells; and
forming a second metallization layer including M1 tracks over the first metallization layer, wherein first M1 tracks are disposed a first predetermined distance from an edge of a cell, wherein second M1 tracks are disposed a second predetermined distance from the edge of the cell, wherein the first M1 tracks are longer than the second M1 tracks, and wherein the first predetermined distance is smaller than the second predetermined distance.

16. The method of claim 15, further comprising:
disposing first vias connected to one or more of the first M1 tracks a third predetermined distance from the edge of the cell, and
disposing second vias connected to one or more of the second M1 tracks a fourth predetermined distance from the edge of the cell, wherein the third predetermined distance is smaller than the fourth predetermined distance.

17. The method of claim 15, wherein the first M1 tracks and the second M1 tracks alternate with each other in a horizontal direction.

18. The method of claim 17, wherein the first M1 tracks of a first cell align with the second M1 tracks of a second cell, and wherein the second M1 tracks of the first cell align with the first M1 tracks of the second cell.

19. The method of claim 18, wherein the first M1 tracks align over tracks of the MD layer, and wherein the second M1 tracks align over the gates.

20. The method of claim 19, wherein each of the M1 tracks, the tracks of the MD layer, and the gates extend in a vertical direction, and each of the M0 tracks extend in a horizontal direction.

* * * * *